April 12, 1966 K. EICKMANN 3,245,637
HYDRAULIC DRIVEN HELICOPTER GROUP
Filed May 20, 1964 2 Sheets-Sheet 1

INVENTOR.
KARL EICKMANN
BY

April 12, 1966   K. EICKMANN   3,245,637
HYDRAULIC DRIVEN HELICOPTER GROUP

Filed May 20, 1964   2 Sheets-Sheet 2

INVENTOR.
KARL EICKMANN

United States Patent Office 3,245,637
Patented Apr. 12, 1966

3,245,637
HYDRAULIC DRIVEN HELICOPTER GROUP
Karl Eickmann, 2420 Isshiki, Hayama-machi,
Kanagawa-ken, Japan
Filed May 20, 1964, Ser. No. 368,882
10 Claims. (Cl. 244—2)

This invention relates to a new kind of a group or groups of vehicles wherein a helicopter or a plurality of helicopters are driven by a base vehicle which supplies hydraulic power for driving hydraulic propellers motors on the helicopter or the plurality of helicopters of the helicopter group.

It was a custom heretofore, that each helicopter operated as an independent helicopter whereby the power plant was on board of the helicopter and drove a propeller or a plurality of propellers of the helicopter.

The power plant on board of the helicopter needed a certain weight and thereby reduced the capability of the helicopter for lifting purposes.

It is therefore the object of this invention, to increase the lifting capacity of a helicopter or of a plurality of helicopters in the same helicopter group or also to increase the lifting capacity of each helicopter in a helicopter group by means of providing the power supply in a separated base vehicle and to supply the hydraulic power, which is generated in the base vehicle, by means of pipes or tubes to the individual helicopter or helicopters of the helicopter group.

It is another object of this invention to use, as a transfer medium for the transfer of the power from the base vehicle to the helicopter or helicopters, fluid, especially hydraulic fluid.

Another object of the invention is to use flexible tubes between the base vehicle and the helicopter or helicopters.

And it is another object of the invention to provide control means in the base vehicle or in the helicopter or individual helicopters of the helicopter group for controlling the quantity and/or the pressure of the flow of fluid for driving the hydromotors of the helicopter propellers.

More objects and features of the invention will become apparent from the study of the figures and the description thereof.

Figure 1:
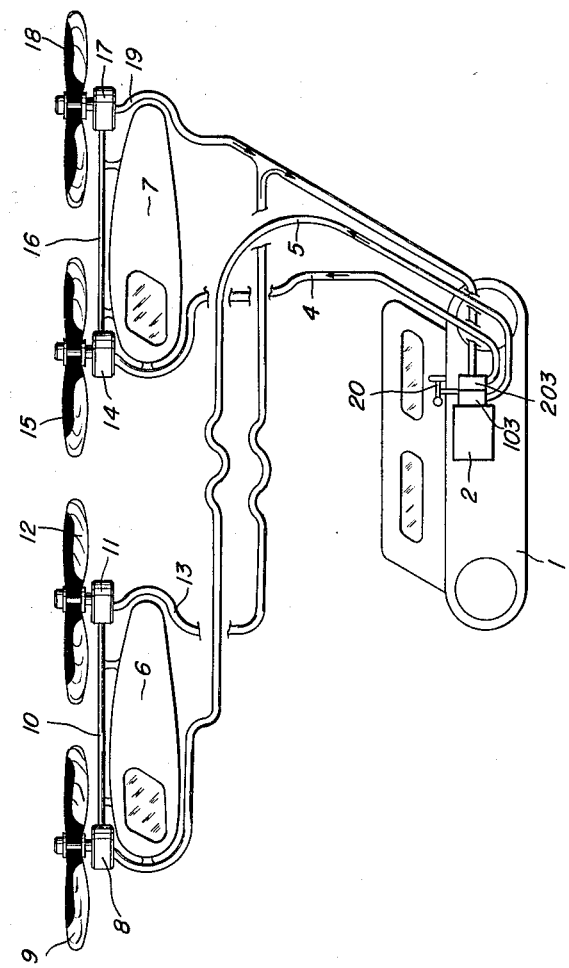

FIGURE 1 shows an embodiment of the invention, which illustrates a base vehicle and two helicopters of a helicopter group which are connected to the base vehicle by flexible tubes and wherein the propellers of the helicopters are driven by hydraulic motors and wherein the hydraulic motors of the helicopter propellers are supplied with fluid under pressure which is generated in the base vehicle and supplied to the helicopter motors by flexible tubes.

Figure 2:
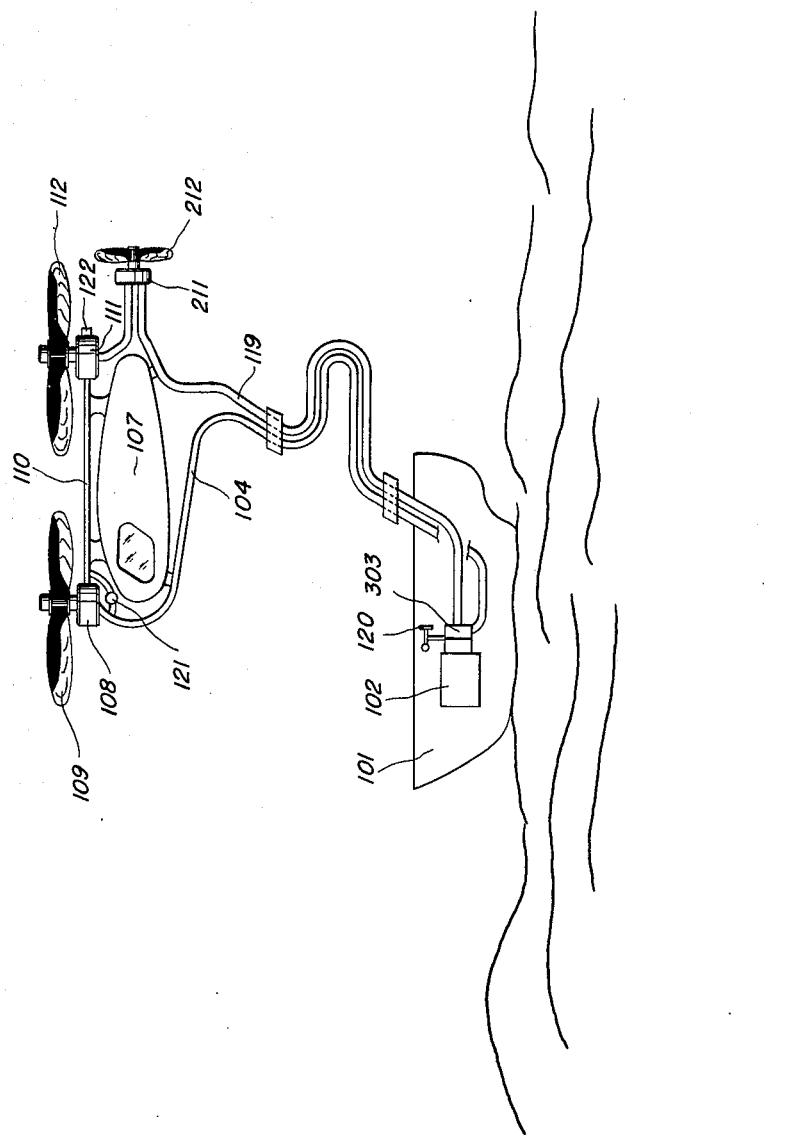

FIGURE 2 shows another embodiment of the invention which shows a base vehicle for movement on water for the supply of fluid under pressure driving hydraulic motors for driving propellers of a helicopter.

Reference numeral 1 demonstrates a base vehicle. The base vehicle is shown as an automobile-like vehicle traveling on the ground, but instead of being a land vehicle, the base vehicle could also be a ship, a boat, or another vehicle, moving on wate and could also be a base aircraft or a large supply helicopter which moves through the air and it is called "the base vehicle" because it contains the base wherein the power supply is generated.

Inside of the base vehicle 1 is the fluid flow producing means including a power plant 2 which is arranged to drive two pumps 103 and 203 to produce a flow of hydraulic fluid under pressure and to deliver the said flow of hydraulic fluid into the flexible pipes or tubes; preferably flexible tubes 4 and 5.

In the embodiment of FIG. 1 the power plant 2 drives two hydraulic pumps 103 and 203, which are of variable delivery quantity. The delivery quantity of the pumps 103 and 203 can be controlled by controller 20. Each pump delivers a flow of fluid which is separated from the flow of the other pump. Pump 103 delivers into tube 5, while pump 203 delivers into tube 4. The flows do not communicate with each other. The flexible tube 4 is connected from the base vehicle to the helicopter 7 while the pipe or flexible tube 5 is connected from the base vehicle to the helicopter 6. A flow of fluid flows from the pump 103 of power plant 2 through tube 5 to helicopter 6 and from helicopter 6 into the hydraulic motor 8, whereby the hydraulic motor 8 rotates and drives propeller 9. A part of the pressure which is present in the tube 5 is lost during driving propeller 9 while the flow of fluid with the rest of pressure in it leaves hydraulic motor 8 and flows through pipe or tube 10 to hydraulic motor 11, thereby driving hydraulic motor 11 while propeller 12 is driven by hydraulic motor 11. Thereafter the fluid leaves hydraulic motor 11 and flows through the return pipe or tube 13 back to the tank or to the pump or power plant inside of the base vehicle 1.

Similarly another flow of fluid flows from the pump 203 or from power plant 2 or 3 through the tube or pipe 4 to helicopter 7 and therethrough into the hydraulic motor 14. Thereby, the hydraulic motor 14 is driven and hydraulic motor 14 drives the propeller 15. Thereafter, the flow of fluid leaves the hydraulic motor 14 and flows through pipe or tube 16 to the hydraulic motor 17.

Hydraulic motor 17 drives the propeller 18 and thereafter the flow of fluid leaves the hydraulic motor 7 and flows through the return pipe or tube 19 back to the base vehicle or to the tank therein or to the power plant or pump therein.

The pressure in the flow of fluid generated in the power plant or pump in the base vehicle is so strong, that it is able to drive at least one propeller on a helicopter or better a plurality of propellers on a helicopter or on a plurality of helicopters.

Instead of connecting two or more propellers in series as shown in the figures it will also be possible to drive each of the propellers separately and to set a respective number of flexible pipes or tubes to each of the hydraulic motors which drives a propeller or propellers.

Adjustment devices for adjusting the delivery quantity of the pump or pumps or of the power plant or for the consumption capability of each of the hydraulic motors can be set in the circuit. It would also be possible to set respective valves in the circuit, on the power plant, on the pumps, or before or after, or on the respective hydraulic motor or motors.

By means of variation, the quantity or the pressure of several or of each of the hydraulic flows, it is possible to lift the helicopters more up or more down in the air and it is also possible thereby to control the lifting capability of the helicopter or of each of the helicopters.

In FIG. 2, wherein another embodiment of the invention is illustrated, the base vehicle 101 is a ship, which moves on the surface of the water. Power plant 102 is located in the base vehicle 101, drives the hydraulic pump 303 and supplies fluid under pressure to the helicopter 107 through the flexible tube 104. The flow of fluid under pressure enters into hydraulic motor 108 and forces the rotor therein to revolve, thereby driving the propeller 109 which is fastened on the shaft of hydraulic motor 108. The fluid leaves the hydraulic motor 108 and thereafter through pipe 110 to hydraulic motor 111 and therethrough, thereby driving the rotor and shaft of motor 111 and thereby propeller 112. The fluid leaves motor 112 and flows through the flow return pipe or flexible tube 119 back to the tank or pump in the base vehicle. By overflow valve 121 a part of the flow of fluid can be enabled to pass beyond motor 108 into medial pipe 110, thereby reducing the rotary velocity of propeller 109 in a limited extent. By means of the displacement adjusting device 122 of motor 111 the rotary velocity of propeller 112 can be changed or adjusted. By controller 120 the delivery quantity of the pump 103 can be controlled and thereby the rotary velocity of the propellers 109 and 112. Depending on the actual design, either the helicopter 107 can tract the base vehicle 101 forward or backward or the base vehicle 101 can tract the helicopter 107 forward or backward. A hydraulic motor 211 with a propeller 212 for forward movement might also be applied, for example into the return flow tube 119.

Helicopter 107 is therefore able to carry a heavy load and is also able to fly in a limited height above the water. People on board of the helicopter 107 have therefore a view into far distances and into valleys between waves of the water. That makes such helicopter suitable for rescuing purposes and also for dropping freight into the water from above. Such helicopter is also useful for detecting purposes, communication purposes, and similar operations.

The feature of the invention is that a relatively heavy and strong power plant can be supplied in the base vehicle while only pipes or tubes of relatively small weight are connected to the helicopter or helicopters and borne by the helicopter or helicopters so that the helicopter itself needs only to bear the body of the helicopter, the pipes, the hydraulic motor or hydraulic motors and the prospective propellers.

Hydraulic motors have a very less weight and so are respective propellers, if a plurality of propellers are provided. Therefore, according to this invention, a big power is supplied from the base vehicle to the helicopter or to a group of helicopters while the helicopter or the group of helicopters only have a relatively less weight because the power plant inside of the helicopter or helicopters is spared.

Therefore, the whole lifting capacity of the propellers, which are driven by the hydraulic motors, can be used for the lifting of freight. The lifting capability of such kinds of helicopters is substantially greater than that of conventional helicopters or aircrafts.

Another feature of the invention is that the helicopter or the helicopters can be controlled by the base vehicle, so that the helicopter or helicopters are automatically kept in the air or take off or set down by remote control which is provided in the base vehicle, on the power plant, on the pump, in the tubing or piping or the like.

The new kind of helicopter is therefore especially suitable to do lifting work and to be controlled by the base vehicle while the helicopter or helicopters can be robots, or wherein people in the helicopter or helicopters are free for other work because they do not need to control the helicopter or helicopters themselves.

But, of course, it is also possible to supply respective control means in each of the helicopters, so that each helicopter can be operated or controlled by the person or persons inside the helicopter or helicopters.

It would also be possible to provide a remote control in one or more helicopters, so that from one or more of the helicopters the operation of the base vehicle could be controlled or advised.

The base vehicle is not limited to a vehicle for running on earth but, the base vehicle can run on land or on water, or it may also be a base helicopter or an aircraft for moving through the air.

Having thus fully described my invention, it should be understood that modifications of the invention are possible. The embodiments of the invention, shown in the figures are by way of example only and it is possible to modify the invention without leaving the scope of the invention. It is therefore intended, that the patent shall include, whatever novelty or feature resides in the invention and that the patent shall be covered by the following claims.

What is claimed is:

1. In combination a vehicle and at least one flying body driven by fluid power supplied from said first vehicle and maneuverable independently of said vehicle, fluid flow producing means carried on at least one of said flying body and said vehicle, a rotatable propulsion element and fluid motor means driven by fluid flow and connected to said propulsion element for rotating said propulsion element all located on the other of said vehicle and flying body from the one having said fluid flow producing means, and conduit means connected between said fluid flow producing means and said fluid motor means and between said vehicle and said flying body and supplying fluid under pressure from said fluid flow producing means to said fluid motor means to cause rotation of said propulsion unit and to return the fluid to said fluid flow producing means, said conduit means being of a material and length permitting independent movement of said vehicle and said flying body.

2. In combination a maneuverable vehicle and at least one flying body driven by fluid power supplied from said first vehicle and maneuverable independently of said vehicle, fluid flow producing means carried on at least one of said vehicle and said flying body, a rotatable propulsion element and fluid motor means driven by fluid flow and connected to said rotatable propulsion element for rotating said propulsion element both located on the other of said vehicle and said flying body from the one having said fluid flow producing means, and conduit means connecting said vehicle and said flying body and said fluid flow producing means and said fluid motor means and supplying fluid under pressure from said fluid flow producing means to said fluid motor means to cause rotation of said propulsion unit and to return the fluid to said fluid flow producing means, said conduit being of a material and length permitting independent maneuvering of said vehicle and said flying body.

3. In combination a vehicle and at least one flying body driven by fluid power supplied from said first vehicle and maneuverable independently of said vehicle, fluid flow producing means carried on said vehicle, at least one rotatable propulsion element and fluid motor means driven by fluid flow and connected to said propulsion element for rotating said element located on said flying body, and conduit means connected between said vehicle and said flying body and said fluid flow producing means and said fluid motor means and supplying fluid under pressure from said fluid flow producing means to said fluid motor means to cause rotation of said propulsion unit and to return the fluid to said fluid flow producing means, said conduit being of a material and length permitting independent movement of said vehicle and said flying body.

4. The combination according to claim 3, wherein said vehicle is a land vehicle.

5. The combination according to claim 3, wherein said vehicle is a water vehicle.

6. In combination a vehicle and at least one flying body maneuverable independently of said vehicle, fluid flow producing means carried on said vehicle, first and second fluid motors mounted on said flying body at spaced locations, a first rotor connected to said first fluid motor and rotatable thereby, a second rotor connected to said second fluid motor and rotatable thereby, and flexible conduit means connected between said fluid flow producing means, said first fluid motor, said second fluid motor and back to said fluid flow producing means, said conduit means being of a material and length permitting independent maneuvering of said flying body and said vehicle.

7. In combination a vehicle and at least one flying body maneuverable independently of said vehicle, fluid flow producing means carried on said vehicle, first and second fluid motors mounted on said flying body at spaced locations, a first rotor connected to said first fluid motor and rotatable thereby, a second rotor connected to said second fluid motor and rotatable thereby, flexible conduit means connected between said fluid flow producing means, said first fluid motor, said second fluid motor and back to said fluid flow producing means, said conduit means being of a material and length permitting independent maneuvering of said flying body and said vehicle, at least one additional flying body having third and fourth fluid motors mounted thereon at spaced locations, third and fourth rotors connected to respective third and fourth fluid motors for rotation by said motors, and additional flexible conduit means connected to said fluid flow producing means, said third rotor and said fourth rotor and back to said fluid flow producing means.

8. In combination a vehicle and at least one flying body maneuverable independently of said vehicle, fluid flow producing means carried on said vehicle, first and second fluid motors mounted on said flying body at spaced locations, a first rotor connected to said first fluid motor and rotatable thereby, a second rotor connected to said second fluid motor and rotatable thereby, flexible conduit means connected between said fluid flow producing means, said first fluid motor, said second fluid motor and back to said fluid flow producing means, said conduit means being of a material and length permitting independent maneuvering of said flying body and said vehicle, and means associated with said fluid flow producing means for varying the flow of fluid to said first and second fluid motors.

9. In combination a vehicle and at least one flying body maneuverable independently of said vehicle, fluid flow producing means carried on said vehicle, first and second fluid motors mounted on said flying body at spaced locations, a first rotor connected to said first fluid motor and rotatable thereby, a second rotor connected to said second fluid motor and rotatable thereby, flexible conduit means connected between said fluid flow producing means, said first fluid motor, said second fluid motor and back to said fluid flow producing means, said conduit means being of a material and length permitting independent maneuvering of said flying body and said vehicle and control means for varying the flow of fluid to each of said fluid motors.

10. In combination a vehicle and at least one flying body maneuverable independently of said vehicle, fluid flow producing means carried on said vehicle, first and second fluid motors mounted on said flying body at spaced locations, a first rotor connected to said first fluid motor and rotatable thereby, a second rotor connected to said second fluid motor and rotatable thereby, flexible conduit means connected between said fluid flow producing means, said first fluid motor, said second fluid motor and back to said fluid flow producing means, said conduit means being of a material and length permitting independent maneuvering of said flying body and said vehicle, at least one propeller carried by said flying body, an additional fluid motor mounted on said flying body and connected to said propeller to rotate said propeller, said conduit means connecting said first and second fluid motors with said additional fluid motor and said fluid flow producing means.

References Cited by the Examiner
UNITED STATES PATENTS

| 2,212,490 | 8/1940 | Adler | 170—135.7 |
| 2,301,098 | 11/1942 | Twyman | 60—978 |
| 2,424,769 | 7/1947 | Page | 244—2 X |
| 2,429,502 | 10/1947 | Young. | |
| 2,514,822 | 7/1950 | Wolfe | 170—135.7 X |
| 2,921,743 | 1/1960 | Westover et al. | 46—77 X |
| 3,149,803 | 9/1964 | Petrides et al. | 244—17.23 |

MILTON BUCHLER, *Primary Examiner.*

FERGUS S. MIDDLETON, *Examiner.*